US009051891B2

(12) United States Patent
Watanabe et al.

(10) Patent No.: US 9,051,891 B2
(45) Date of Patent: Jun. 9, 2015

(54) CONTROL DEVICE FOR VEHICLE

(75) Inventors: Hideo Watanabe, Toyota (JP); Masaaki Otsubo, Miyoshi (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 357 days.

(21) Appl. No.: 13/581,575

(22) PCT Filed: Feb. 24, 2012

(86) PCT No.: PCT/JP2012/054636

§ 371 (c)(1),
(2), (4) Date: Aug. 28, 2012

(87) PCT Pub. No.: WO2013/125040

PCT Pub. Date: Aug. 29, 2013

(65) Prior Publication Data

US 2013/0225368 A1 Aug. 29, 2013

(51) Int. Cl.

*B60W 10/06* (2006.01)
*F02D 41/08* (2006.01)
*F02D 41/02* (2006.01)

(52) U.S. Cl.

CPC ............. *F02D 41/083* (2013.01); *Y10T 477/79* (2015.01); *F02D 41/022* (2013.01); *F02D 2200/101* (2013.01); *F02D 2200/1012* (2013.01); *F02D 2200/501* (2013.01)

(58) Field of Classification Search

USPC .......................................... 477/107, 174, 181
See application file for complete search history.

(56) References Cited

U.S. PATENT DOCUMENTS

| | | | | |
|---|---|---|---|---|
| 5,678,674 | A | 10/1997 | Nehse | |
| 6,142,909 | A * | 11/2000 | Drexl et al. | 477/91 |
| 7,744,504 | B2 | 6/2010 | Satou et al. | |
| 8,556,774 | B2 * | 10/2013 | Morita | 477/181 |

FOREIGN PATENT DOCUMENTS

| | | | |
|---|---|---|---|
| DE | 195 24 412 | A1 | 9/1996 |
| DE | 10 2007 055 858 | A1 | 7/2008 |
| EP | 0 730 105 | A2 | 9/1996 |
| FR | 2 910 418 | A1 | 6/2008 |
| JP | 04-050516 | A | 2/1992 |
| JP | 06-146945 | A | 5/1994 |

(Continued)

OTHER PUBLICATIONS

International Search Report of PCT/JP2012/054636 dated Apr. 3, 2012.

*Primary Examiner* — Jacob S Scott
(74) *Attorney, Agent, or Firm* — Sughrue Mion, PLLC

(57) ABSTRACT

Provided is a control device for a vehicle including an engine, a manual transmission, a clutch disposed between the engine and the manual transmission, and a clutch manipulation unit with which a driver controls the state of the clutch. In the control device for the vehicle, an engine revolution increasing control to increase an engine revolution is started at a predetermined start timing when the clutch is switched from a disengaged state to an engaged state by manipulation of the clutch manipulation unit at the time of starting the vehicle in an accelerator-off state, and in a case where the engine revolution is largely degrading in a predetermined period around start of the engine revolution increasing control, the start timing of the engine revolution increasing control is advanced for a next starting of the vehicle in the accelerator-off state.

5 Claims, 13 Drawing Sheets

(56) References Cited

FOREIGN PATENT DOCUMENTS

| | | | |
|---|---|---|---|
| JP | 08-247168 | A | 9/1996 |
| JP | 2001-073837 | A | 3/2001 |
| JP | 2006-233911 | A | 9/2006 |
| JP | 2008-121647 | A | 5/2008 |
| JP | 2008-157184 | A | 7/2008 |
| JP | 2008-275036 | A | 11/2008 |
| JP | 2010-276117 | A | 12/2010 |
| JP | 2011-033006 | A | 2/2011 |

* cited by examiner

Case where start timing is early

CONTROL DEVICE FOR VEHICLE

CROSS REFERENCE TO RELATED APPLICATIONS

This application is a National Stage of International Application No. PCT/JP2012/054636 filed Feb. 24, 2012, the contents of all of which are incorporated herein by reference in their entirety.

TECHNICAL FIELD

The present invention relates to a control device for a vehicle including a manual transmission.

BACKGROUND ART

Conventionally, vehicles have been known that include an engine, a manual transmission, and a clutch disposed between the engine and the manual transmission (for example, refer to patent documents 1 and 2).

Patent document 1 discloses a vehicle that includes a clutch pedal with which a driver controls the state of a clutch. The vehicle disclosed in patent document 1 is configured as follows. Upon starting the vehicle in an accelerator-off state, an engine revolution is increased based on the stroke position and stroke speed of the clutch when the clutch is switched from a disengaged state to an engaged state by manipulation of the clutch pedal. Accordingly, the vehicle including the clutch pedal can be started smoothly with a manipulation of an accelerator pedal omitted.

Patent document 2 discloses a vehicle including no clutch pedal and configured to control the state of a clutch automatically based on a manipulation amount of an accelerator pedal and the like. In the vehicle disclosed in patent document 2, when the clutch is switched from the disengaged state to the engaged state in order to shorten the time required to complete the engagement, the clutch is moved at a first moving speed and then, in order to avoid engine stall and the like, the clutch is moved at a second moving speed slower than the first moving speed. Moreover, the vehicle disclosed in patent document 2 is configured as follows. At the time of starting the vehicle in an accelerator-on state, the switching position of the moving speed of the clutch is corrected so as to shift toward the disengagement side when the engine revolution is decreased below a predetermined threshold value. This prevents shock from occurring at the time of engaging the clutch and improves the startability.

RELATED ART DOCUMENTS

Patent Documents

Patent Document 1: Japanese Unexamined Patent Publication No. 2008-157184.
Patent Document 2: Japanese Unexamined Patent Publication No. 2010-276117.

SUMMARY OF THE INVENTION

Problems to be Solved by the Invention

However, in the conventional vehicle disclosed in patent document 1, it is presupposed that the contact position (touch point) of the clutch is constantly the same. Accordingly, there exist the following problems. For example, in a case where the contact position of the clutch fluctuate due to production tolerance (individual tolerance), or in the case where the contact position of the clutch changes over time, it becomes difficult to increase an engine revolution appropriately.

Patent document 2 discloses a configuration in which the switching position of the moving speed of the clutch is corrected in the vehicle in which the state of the clutch is automatically controlled regardless of a manipulation by a driver. However, in vehicles including a clutch pedal, the state of the clutch depends on a manipulation by a driver. Accordingly, it may be difficult to apply the configuration disclosed in patent document 2 to the vehicles including a clutch pedal. Furthermore, in the vehicles including a clutch pedal, the engaging point of a clutch is difficult to study at the time of vehicle start operation, and it is not so necessary to do so. Accordingly, how to study the engaging point has not been examined sufficiently.

The present invention has been made to solve the above problems. An object of the present invention is to provide a control device for a vehicle that allows an engine revolution of a vehicle including a clutch manipulation unit to be appropriately increased at the time of starting the vehicle in the accelerator-off state.

Means of Solving the Problems

An aspect of the present invention is a control device applied to a vehicle that includes an engine, a manual transmission, a clutch disposed between the engine and the manual transmission, and a clutch manipulation unit with which a driver controls the state of the clutch. Specifically, the vehicle control device according to the present invention is configured in such a manner that an engine revolution increasing control to increase an engine revolution is started at a predetermined start timing when the clutch is switched from a disengaged state to an engaged state by manipulation of the clutch manipulation unit at the time of starting the vehicle in an accelerator-off state. Further, the vehicle control device is configured in such a manner that in a case where the engine revolution is largely degrading in a predetermined period around start of the engine revolution increasing control, the start timing of the engine revolution increasing control is advanced for a next starting of the vehicle in the accelerator-off state. The predetermined period around start of the engine revolution increasing control is a period including the start timing of the engine revolution increasing control, and is a predetermined period between points before and after start of the engine revolution increasing control.

With the above configuration, by correcting the start timing of the engine revolution increasing control, the start timing of the engine revolution increasing control at the time of starting the vehicle in the accelerator-off state can be prevented from being too late. As a result, the engine revolution can be prevented from excessively decreasing. Accordingly, the engine revolution may be appropriately increased at the time of starting the vehicle in the accelerator-off state.

In the vehicle control device, the case where the engine revolution is largely degrading may include a case where the engine revolution is decreased below a first threshold value. The first threshold value is, for example, a predetermined value smaller than an idle revolution.

In the above control device for a vehicle, in a case where the engine revolution is not largely degrading in the predetermined period around start of the engine revolution increasing control, the start timing of the engine revolution increasing control may be delayed for the next starting of the vehicle in the accelerator-off state. The case where the engine revolution is not largely degrading may include a case where the engine revolution is increasing.

With the above configuration, by correcting the start timing of the engine revolution increasing control, the start timing of the engine revolution increasing control at the time of starting the vehicle in the accelerator-off state can be prevented from being too early. As a result, the engine revolution can be prevented from excessively increasing. Accordingly, the engine revolution can be appropriately increased at the time of starting the vehicle in the accelerator-off state.

Here, the case where the engine revolution is not largely decreasing may include a case where the engine revolution exceeds a second threshold value. The second threshold value is, for example, a predetermined value larger than the idle revolution.

In the control device for a vehicle configured to delay the start timing of the engine revolution increasing control for the next starting of vehicle in the accelerator-off state in the case where the engine revolution is not largely decreasing, the first correction amount to advance the start timing of the engine revolution increasing control may be larger than the second correction amount to delay the start timing of the engine revolution increasing control.

When the engine revolution is largely degrading, it can be determined that the start timing of the engine revolution increasing control is late. However, when the engine revolution is not largely degrading, whether the start timing of the engine revolution increasing control is early or ideal may be difficult to determine. Accordingly, the above configuration allows the start timing of the engine revolution increasing control to be set within a proper range.

In the above control device for a vehicle, in a case where the engine revolution is largely decreasing before start of the engine revolution increasing control, the engine revolution increasing control may be started.

With the above configuration, the engine revolution increasing control is started immediately when the start timing of the engine revolution increasing control is late, whereby the engine revolution can be prevented from excessively decreasing.

In the above control device for a vehicle, the start timing of the engine revolution increasing control may be determined based on a stroke position of the clutch.

Effect of the Invention

According to the control device for a vehicle of the present invention, at the time of starting a vehicle including a clutch manipulation unit in the accelerator-off state, an engine revolution can be increased appropriately.

MODES FOR CARRYING OUT THE INVENTION

Embodiments of the present invention will be described with reference to the accompanying drawings.

Figure 1:
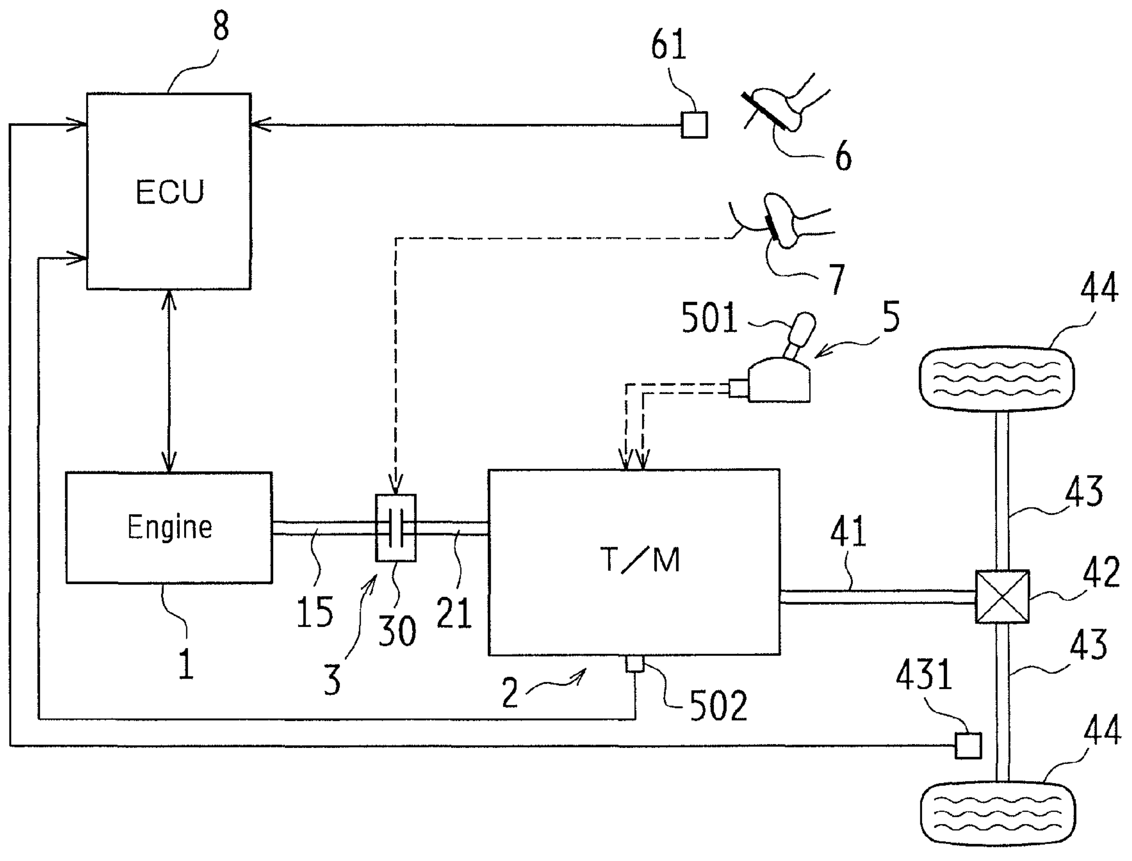
FIG. 1 is a diagram illustrating a schematic configuration of a vehicle according to an embodiment of the present invention.

FIG. 1 is a diagram illustrating a schematic configuration of a vehicle according to an embodiment of the present invention.

The vehicle shown in FIG. 1 is a vehicle of an FR (front engine rear drive) type, and includes an engine 1 as a driving power source, a manual transmission 2, a clutch device 3, a shift device 5, an accelerator pedal 6, a clutch pedal 7, and the like. In this vehicle, a driving force (driving torque) generated by the engine 1 is input from a crankshaft 15 as an output shaft of the engine 1 into the manual transmission 2 via the clutch device 3. The torque input into the manual transmission 2 is subjected to speed change at an appropriate speed change ratio by the manual transmission 2, and is output from the output shaft 22 (refer to FIG. 3). Then, the torque output from the output shaft 22 is transmitted to right and left rear wheels (driving wheels) 44 and 44 via a propeller shaft 41, a differential gear 42, and axles 43 and 43. Hereafter, each portion of the vehicle will be described.

—Engine—

Figure 2:
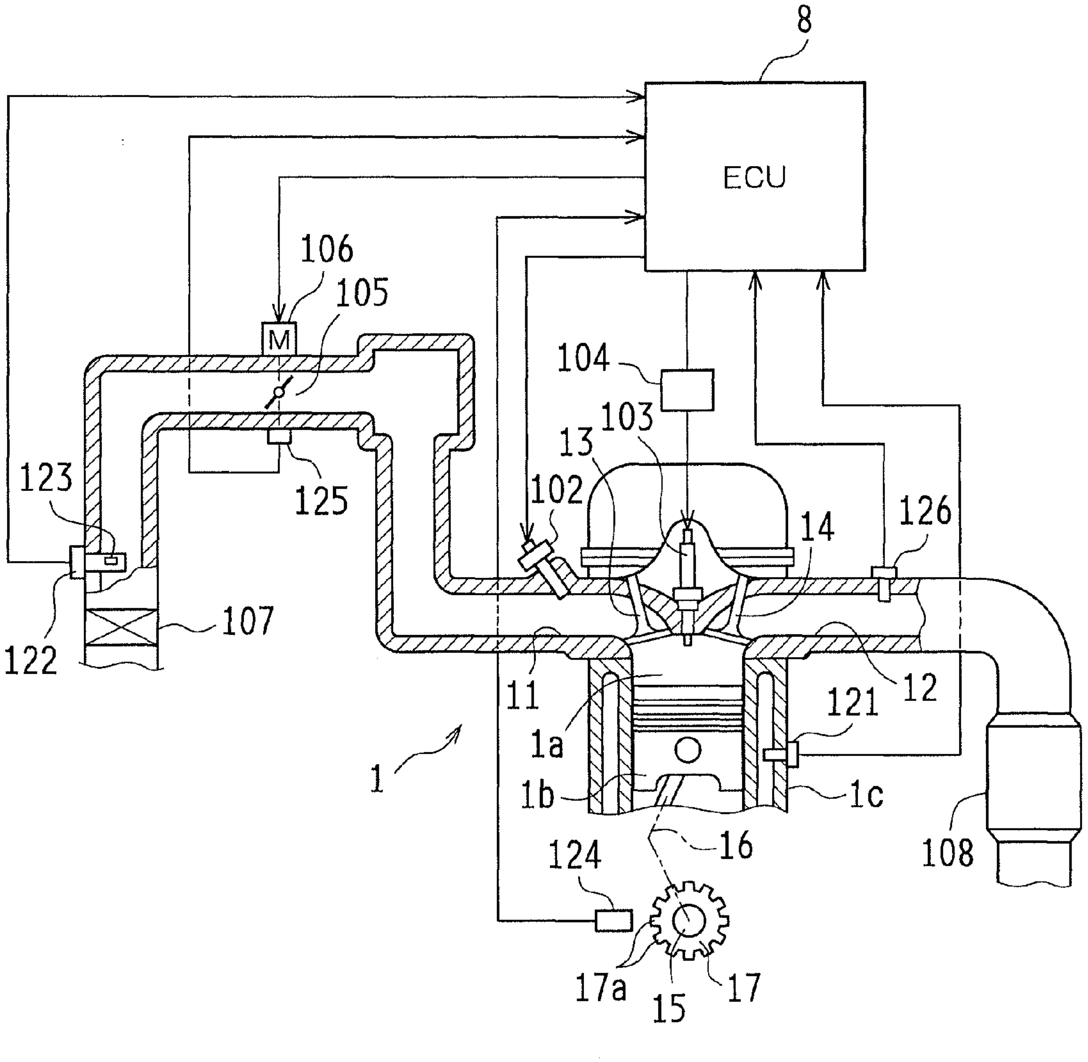
FIG. 2 is a diagram illustrating a schematic configuration of an engine mounted on the vehicle shown in FIG. 1.

FIG. 2 is a diagram illustrating a schematic configuration of the engine 1 mounted on the vehicle shown in FIG. 1.

The engine (internal combustion engine) 1 is, for example, a multi-cylinder gasoline engine, and as shown in FIG. 2, includes a piston 1*b* defining a combustion chamber 1*a*, and the crankshaft 15 serving as an output shaft. The piston 1*b* is coupled to the crankshaft 15 via a connecting rod 16. The reciprocating movement of the piston 1*b* is converted into rotational movement of the crankshaft 15 by the connecting rod 16.

The crankshaft 15 is attached with a signal rotor 17. On the outer periphery of the signal rotor 17, a plurality of projections 17*a* are formed at regular intervals. Adjacent to a side of the signal rotor 17, an engine revolution sensor 124 is disposed. The engine revolution sensor 124 is, for example, an electromagnetism pickup, and generates pulse signals (output pulses) in accordance with the number of projections 17*a* that pass over a position opposite to the engine revolution sensor 124 as the crankshaft 15 rotates. Furthermore, on a cylinder block 1*c* of the engine 1, a water temperature sensor 121 to detect the temperature of engine water (temperature of cooling water) is disposed.

An ignition plug 103 is disposed in the combustion chamber 1*a* of the engine 1. The ignition timing of the ignition plug 103 is adjusted by an igniter 104. The igniter 104 is controlled by an ECU 8.

An intake path 11 and an exhaust path 12 are coupled to the combustion chamber 1*a*. An intake valve 13 is disposed between the intake path 11 and the combustion chamber 1*a*. The intake valve 13 is drivingly opened and closed to implement communication and disconnection between the intake path 11 and the combustion chamber 1*a*. An exhaust valve 14 is disposed between the exhaust path 12 and the combustion chamber 1*a*. The exhaust valve 14 is drivingly opened or closed to implement communication and disconnection between the exhaust path 12 and the combustion chamber 1*a*. The open/close drive of the intake valve 13 and the exhaust valve 14 is carried out respectively based on rotation of an intake cam shaft and an exhaust cam shaft (not shown), to which the rotation of the crankshaft 15 is transmitted.

Along the intake path 11, an air cleaner 107, an airflow meter 122, an intake air temperature sensor 123, an electronically controlled throttle valve 105 to regulate the amount of intake air of the engine 1, and the like are disposed. Along the exhaust path 12, an $O_2$ sensor 126 to detect an oxygen concentration in an exhaust gas, three-way catalysts 108, and the like are disposed.

The throttle valve 105 is driven by a throttle motor 106 to have the opening degree (throttle opening degree) adjusted. The amount of intake air of the engine 1 is adjusted in accordance with the throttle opening degree. The throttle opening degree is detected by a throttle opening degree sensor 125. The throttle motor 106 is drivingly controlled by the ECU 8.

Also along the intake path 11, an injector (fuel injection valve) 102 is disposed. The injector 102 is supplied with fuel having a predetermined pressure from a fuel tank (not shown) via a fuel pump, and then the fuel is injected to the intake path 11 by the injector 102. Then, the fuel injected by the injector 102 is mixed with the intake air into air-fuel mixture gas, and introduced into the combustion chamber 1*a* of the engine 1. The mixture gas (fuel and air) introduced in the combustion chamber 1*a* is ignited by the ignition plug 103 for combustion and explosion. The combustion and explosion of the mixture gas in the combustion chamber 1*a* causes the reciprocating movement of the piston 1*b*, thereby rotating the crankshaft 15.

—Manual Transmission—

Figure 3:
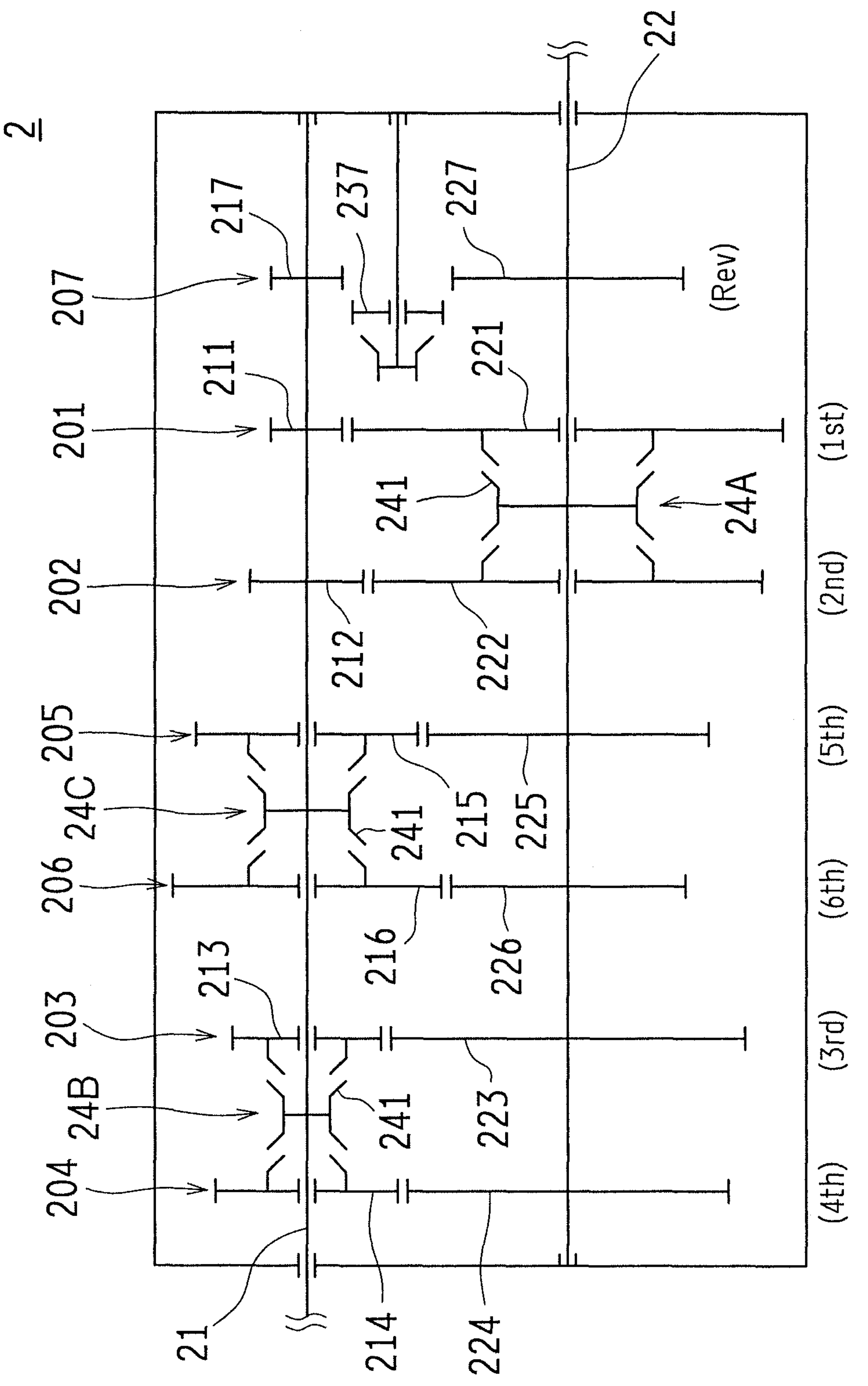
FIG. 3 is a skeleton diagram illustrating a schematic configuration of a manual transmission mounted on the vehicle shown in FIG. 1.

FIG. 3 is a skeleton diagram illustrating a schematic configuration of the manual transmission 2 mounted on the vehicle shown in FIG. 1.

The manual transmission 2 is a generally-known synchromesh manual transmission (for example, six forward shift stages and one backward shift stage), and as shown in FIG. 3, an input shaft 21 is coupled to the crankshaft 15 of the engine 1 via the clutch device 3. Furthermore, an output shaft 22 is coupled to a propeller shaft 41 (refer to FIG. 1). Driving torque from the engine 1 is subjected to speed change at a given speed change ratio by the manual transmission 2, and then transmitted to the rear wheel 44 and 44 sides.

The manual transmission 2 includes six forward shift gear stages 201 to 206 different in speed change ratio (gear ratio), one backward gear stage 207, a synchro-mesh mechanism 24A for the first-second speed shift, a synchro-mesh mechanism 24B for the third-fourth speed shift, a synchro-mesh mechanism 24C for the fifth-sixth speed shift, and the like.

The forward shift gear stages 201 to 206 are formed of combination of respective driving gears 211 to 216 mounted on the input shaft 21 side and respective driven gears 221 to 226 mounted on the output shaft 22 side. The driving gears 211 to 216 mesh respectively with the driven gears 221 to 226.

The respective driving gears 211 and 212 of the first speed and the second speed are mounted on the input shaft 21 in such a manner as to integrally rotate therewith. On the other hand, the respective driving gears 213 to 216 of the third to sixth speeds are relatively rotatably mounted on the input shaft 21 via respective bearings (for example, cage and roller). Furthermore, the respective driven gears 221 and 222 of the first speed and the second speed are relatively rotatably mounted on the output shaft 22 via respective bearings (for example, cage and roller). On the other hand, the respective driven gears 223 to 226 of the third to sixth speeds are mounted on the output shaft 22 in such a manner as to integrally rotate therewith. The backward shift gear stage 207 includes a reverse driving gear 217, a reverse driven gear 227, a reverse idler gear 237, and the like.

The synchro-mesh mechanisms 24A, 24B, and 24C have a known configuration, and thus detailed description thereof is omitted. The synchro-mesh mechanisms 24A, 24B, and 24C have approximately the same configuration, and each include a sleeve 241, a synchronizer ring, a clutch hub, and the like although not elaborated in the figure. The sleeve 241 is slid in the axial direction by a shift fork (not-shown) of the manual transmission 2. The shift fork is operated so as to establish a shift stage corresponding to a shift position selected by manipulating a shift lever 501 (refer to FIG. 1) of the shift device 5. The shift lever 501 and the shift fork are mechanically linked to each other via cables, links, and the like. The shift position selected using the shift lever 501 is detected by a shift position sensor 502 (refer to FIG. 1) provided to the manual transmission 2. The shift position sensor 502 may be disposed in the vicinity of the shift lever 501.

Now, description will be given on the shift pattern (shift gate shape) of a shift gate that is disposed on a floor in the vehicle cabin and configured to guide the movement of the shift lever 501 of the shift device 5.

Figure 4:
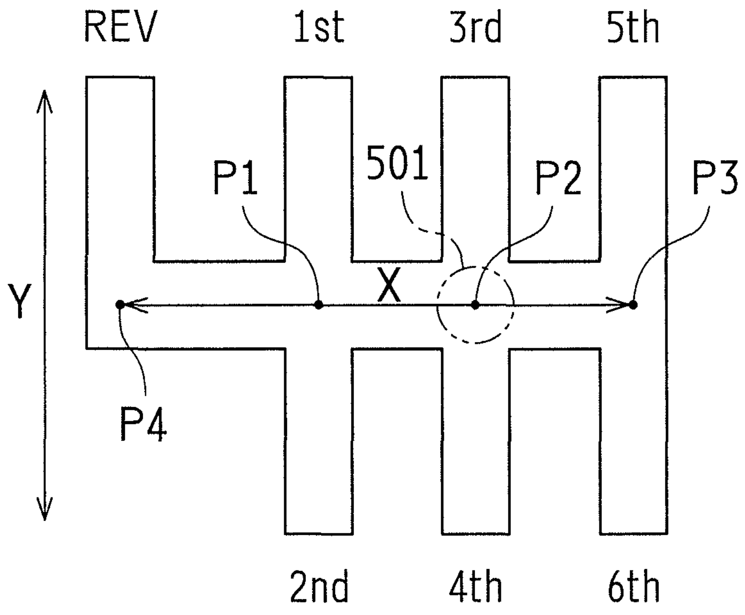
FIG. 4 is a diagram schematically illustrating a shift pattern of the manual transmission mounted on the vehicle shown in FIG. 1.

FIG. 4 schematically shows the shift pattern of the manual transmission 2 having six forward shift stages and one backward shift stage. In this embodiment, the shift lever 501 is configured to allow select manipulation in the direction indicated with an arrow X shown in FIG. 4 and shift manipulation in the direction indicated with an arrow Y orthogonal to the direction of the select manipulation.

In the select manipulation direction, a first-speed and second-speed select position P1, a third-speed and fourth-speed select position P2, a fifth-speed and sixth-speed select position P3, and a reverse select position P4 are arranged in a row.

By the shift manipulation (manipulation in the direction of the arrow Y) at the first-speed and second-speed select position P1, the shift lever 501 can be shifted to a first speed position 1st or a second speed position 2nd. When the shift lever 501 is manipulated to the first speed position 1st, the sleeve 241 of the synchro-mesh mechanism 24A for the first-second speed change in the manual transmission 2 is operated to the establishment side of the first speed (the right side in FIG. 3), thus establishing the first speed stage. Furthermore, when the shift lever 501 is manipulated to the second speed position 2nd, the sleeve 241 of the synchro-mesh mechanism 24A for the first-second speed change is operated to the establishment side of the second speed (the left side in FIG. 3), thus establishing the second speed stage.

Similarly, by the shift manipulation at the third-speed and fourth-speed select position P2, the shift lever 501 can be shifted to a third speed position 3rd or a fourth speed position 4th. When the shift lever 501 is manipulated to the third speed position 3rd, the sleeve 241 of the synchro-mesh mechanism 24B for the third-fourth speed change in the manual transmission 2 is operated to the establishment side of the third speed (the right side in FIG. 3), thus establishing the third speed stage. Also, when the shift lever 501 is manipulated to the fourth speed position 4th, the sleeve 241 of the synchro-mesh mechanism 24B for the third-fourth speed change is operated to the establishment side of the fourth speed (the left side in FIG. 3), thus establishing the fourth speed stage.

Furthermore, by the shift manipulation at the fifth-speed and sixth-speed select position P3, the shift lever 501 can be shifted to a fifth speed position 5th or a sixth speed position 6th. When the shift lever 501 is manipulated to the fifth speed position 5th, the sleeve 241 of the synchro-mesh mechanism 24C for the fifth-sixth speed change in the manual transmission 2 is operated to the establishment side of the fifth speed (the right side in FIG. 3), thus establishing the fifth speed stage. Also, when the shift lever 501 is manipulated to the sixth speed position 6th, the sleeve 241 of the synchro-mesh mechanism 24C for the fifth-sixth speed change is operated to the establishment side of the sixth speed (the left side in FIG. 3), thus establishing the sixth speed stage.

Furthermore, by the shift manipulation at the reverse select position P4, the shift lever 501 can be shifted to a reverse position REV. When the shift lever 501 is manipulated to the reverse position REV, the synchro-mesh mechanisms 24A, 24B, and 24C in the manual transmission 2 turn into neutral state, and the reverse idler gear 237 in the manual transmission 2 is actuated, thus establishing the backward shift stage.

In addition, in this embodiment, the third-speed and fourth-speed select position P2 is configured to serve as the neutral position. Accordingly, when the shift lever 501 is manipulated to this neutral position P2, the synchro-mesh mechanisms 24A, 24B, and 24C in the manual transmission 2 each turn into the neutral state, whereby the manual transmission 2 turn into the neutral state to transmit no torque between the input shaft 21 and the output shaft 22.

—Clutch Device—

Figure 5:
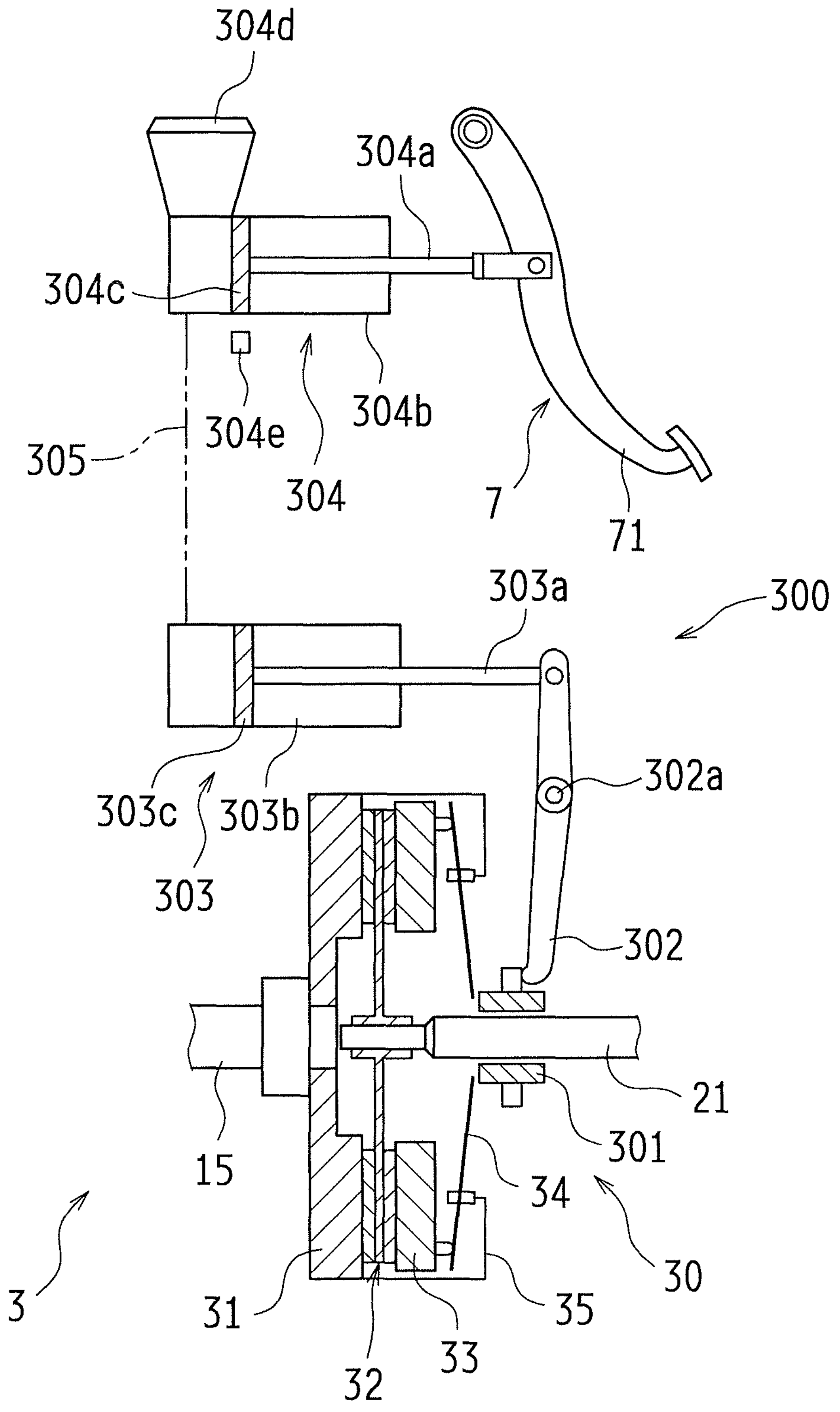
FIG. 5 is a diagram illustrating a schematic configuration of a clutch device mounted on the vehicle shown in FIG. 1.

FIG. 5 is a drawing illustrating a schematic configuration of the clutch device 3 mounted on the vehicle shown in FIG. 1.

As shown in FIG. 5, the clutch device 3 includes a clutch mechanism 30 (also, simply referred to as "clutch 30"), and a clutch actuating device 300 configured to actuate the clutch 30 in response to a depressing manipulation of the clutch pedal 7.

The clutch 30 is a dry-type single plate friction clutch, and is disposed so as to be interposed between the crankshaft 15 and the input shaft 21 of the manual transmission 2. It is also possible to employ any other configuration for the clutch 30.

Specifically, the clutch 30 includes a flywheel 31, a clutch disc 32, a pressure plate 33, a diaphragm spring 34, and a clutch cover 35. The flywheel 31 and the clutch cover 35 are integrally rotatably attached to the crankshaft 15 serving as the input shaft of the clutch 30. The clutch disc 32 is splined to the input shaft 21 of the manual transmission 2 as the output shaft of the clutch 30. This allows the clutch disc 32 to rotate integrally with the input shaft 21 while being slidably shiftable in the axial direction (left and right direction in FIG. 5). The pressure plate 33 is disposed between the clutch disc 32 and the clutch cover 35. The pressure plate 33 is biased toward the flywheel 31 side by the outer periphery portion of the diaphragm spring 34.

The clutch actuating device 300 includes a release bearing 301, a release fork 302, a clutch release cylinder 303, a clutch master cylinder 304, and the like. The release bearing 301 is slidably attached to the input shaft 21 in the axial direction. Adjacent to the release bearing 301, the release fork 302 is rotatably supported about a shaft 302*a*, and one end portion (lower end portion in FIG. 5) of the release fork 302 is in contact with the release bearing 301. The other end portion (upper end portion in FIG. 5) of the release fork 302 is coupled to one end portion (right end portion in FIG. 5) of a rod 303*a* of the clutch release cylinder 303.

The clutch release cylinder 303 has such a configuration that a piston 303*c* and the like are incorporated in a cylinder body 303*b*. The piston 303*c* is coupled to the other end portion (left end portion in FIG. 5) of the rod 303*a*. The clutch release cylinder 303 is coupled to the clutch master cylinder 304 via an oil-pressure pipe 305.

Similarly to the clutch release cylinder 303, the clutch master cylinder 304 has such a configuration that a piston 304*c* and the like are incorporated in a cylinder body 304*b*. The piston 304*c* is coupled to one end portion (left end portion in FIG. 5) of the rod 304*a*. The other end potion (right end portion in FIG. 5) of the rod 304*a* is coupled to an intermediate portion of a pedal lever 71 of the clutch pedal 7. On the upper portion of the cylinder body 304*b*, a reserve tank 304*d* is disposed that is configured to supply a clutch fluid (oil) serving as a working fluid into the cylinder body 304*b*.

In the clutch master cylinder 304, upon receipt of operation power caused by the depressing manipulation of the clutch pedal 7 by a driver, the piston 304*c* moves in the cylinder body 304*b* so as to generate an oil pressure. The oil pressure generated in the clutch master cylinder 304 is transmitted through oil in the oil pressure pipe 305 to the clutch release cylinder 303.

In the clutch device 3, the release fork 302 is actuated in accordance with the oil pressure in the clutch release cylinder 303, thereby engaging or disengaging the clutch 30.

Specifically, in the state (clutch engaged state) shown in FIG. 5, when a depressing amount of the clutch pedal 7 becomes large, oil is supplied from the clutch master cylinder 304 to the clutch release cylinder 303, whereby the oil pressure in the clutch release cylinder 303 rises. Then, the piston 303*c* and the rod 303*a* move rightward in FIG. 5, and in turn, the release fork 302 rotates (in FIG. 5, rotated clockwise) about the shaft 302*a*, whereby the release bearing 301 is pressed to the flywheel 31 side. Then, the movement of the release bearing 301 in the above direction makes the center portion of a diaphragm spring 34 elastically deformed in the same direction. This reduces a biasing force toward the pressure plate 33 by the diaphragm spring 34. This results in half-clutch state, where the pressure plate 33, the clutch disc 32, and the flywheel 31 are engaged while being slipped.

When, in this half clutch state, the release bearing 301 further moves toward the flywheel 31 side, and thus the biasing force toward the pressure plate 33 by the diaphragm spring 34 is further reduced, the pressure plate 33, the clutch disc 32, and the flywheel 31 are separated from each other so that the clutch 30 turns into a disengaged (released) state (clutch disengaged state). In this clutch disengaged state, torque transmission from the engine 1 to the manual transmission 2 is cut off.

On the other hand, when, in the clutch disengaged state, the depressing of the clutch pedal 7 is released to reduce the depressing amount of the clutch pedal 7, the oil is brought back from the clutch release cylinder 303 to the clutch master cylinder 304, whereby the oil pressure in the clutch release cylinder 303 drops. When this happens, the piston 303*c* and the rod 303*a* move leftward in FIG. 5, and in turn, the release fork 302 rotates (in FIG. 5, rotates counterclockwise) about the shaft 302*a*, whereby the release bearing 301 moves away from the flywheel 31. This movement increases the biasing force toward the pressure plate 33 by the outer periphery portion of the diaphragm spring 34. This leads to an increase in a frictional force between the pressure plate 33 and the clutch disc 32, and between the clutch disc 32 and the flywheel 31. As a result, the clutch 30 turns into the half clutch state and then turns into a clutch engaged state. In the clutch engaged state, the pressure plate 33, the clutch disc 32, and the flywheel 31 integrally rotate. Accordingly, the crankshaft 15 and the input shaft 21 integrally rotate, whereby torque is transmitted between the engine 1 and the manual transmission 2.

The clutch master cylinder 304 includes a stroke sensor 304*e* to detect the stroke position (clutch position) of the piston 304*c* (clutch 30).

—Control System—

Figure 6:
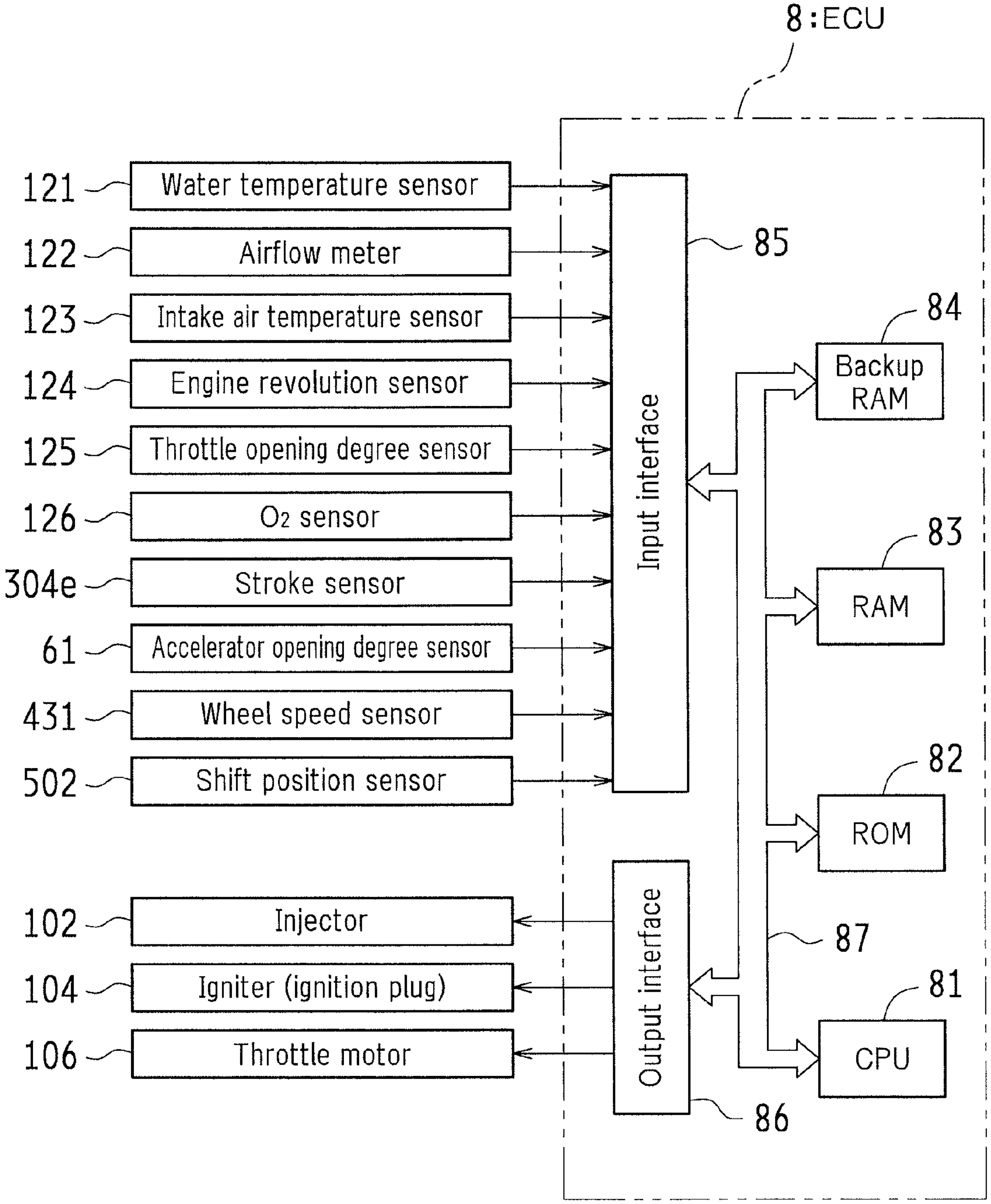
FIG. 6 is a block diagram illustrating a configuration of a control system, such as an ECU mounted on the vehicle shown in FIG. 1.

In the vehicle with the above configuration, the ECU 8 is in charge of various kinds of control for the engine 1. As shown in FIG. 6, the ECU 8 includes a CPU 81, a ROM 82, a RAM 83, a backup RAM 84, an input interface 85, an output interface 86, and the like.

The ROM 82 stores various control programs, maps referred to at the time of executing those various control programs, and the like. The CPU 81 executes arithmetic processing based on the various control programs and the maps stored in the ROM 82. The RAM 83 is a memory that temporarily store arithmetic processing results of the CPU 81 and data input from various sensors, various switches, and the like. The backup RAM 84 is a non-volatile memory configured to store data and the like that need storing while the engine 1 is stopped. The CPU 81, the ROM 82, the RAM 83, and the backup RAM 84 are coupled to each other via a bus 87 and further coupled to the input interface 85 and the output interface 86.

The input interface 85 is coupled with a stroke sensor 304*e*, a water temperature sensor 121, an airflow meter 122, an intake air temperature sensor 123, an engine revolution sensor 124, a throttle opening degree sensor 125, an $O_2$ sensor 126, and the like. In addition, the input interface 85 is coupled with an accelerator opening degree sensor 61, a wheel speed sensor 431, and a shift position sensor 502. The accelerator opening degree sensor 61 is disposed adjacent to the accelerator pedal 6 (refer to FIG. 1), and detects a depressing amount (accelerator opening degree) of the accelerator pedal 6 by a driver. The wheel speed sensor 431 is disposed adjacent to the axle 43 (refer to FIG. 1), and detects the speed of the vehicle. The shift position sensor 502 detects a shift position selected by the shift lever 501 (refer to FIG. 1) of the shift device 5.

The output interface 86 is coupled with, an injector 102, an igniter 104 of an ignition plug 103, a throttle motor 106 of a throttle valve 105, and the like. Based on the output of each of the above-mentioned various sensors and various switches, the ECU 8 performs various kinds of control for the vehicle that include a drive control (fuel injection control) for the injector 102, an ignition timing control for the ignition plug 103, a drive control for the throttle motor 106 of the throttle valve 105, and the like.

Furthermore, the ECU 8 is configured to start an engine revolution increasing control (idle-up control) to increase an engine revolution (engine rotation speed) at a predetermined start timing under the following conditions. Specifically, the increasing control is started when the clutch 30 is switched from the disengaged state to the engaged state by the manipulation of the clutch pedal 7 at the time of starting the vehicle in the accelerator-off state. This allows manipulation of the accelerator pedal 6 at the time of starting the vehicle to be omitted, and allows the vehicle to be started (drive start) smoothly. Hereafter, the starting operation for the vehicle in the accelerator-off state will be described in detail.

—Starting Operation in Accelerator-Off State—

At the time of starting the vehicle in the accelerator-off state, the ECU 8 according to this embodiment performs an idle-up control when the stroke position of the clutch 30 passes over (exceeds) an idle-up control starting position Ps. Furthermore, the ECU 8 performs the following operations at the time of starting the vehicle in the accelerator-off state. Specifically, the ECU 8 is configured to advance the start timing of the idle-up control for the next time of starting the vehicle in the accelerator-off state when the engine revolution decreases below a first threshold value Th1 during a predetermined period around start of the idle-up control. The ECU 8 is also configured to delay the start timing of the idle-up control for the next time of starting the vehicle in the accelerator-off state when the engine revolution exceeds a second threshold value Th2 during the predetermined period around start of the idle-up control. Here, the first threshold value Th1 and the second threshold value Th2 are each a predetermined revolution. The first threshold value Th1 is a revolution smaller than an idle revolution, and the second threshold value Th2 is a revolution larger than the idle revolution. Furthermore, the predetermined period is a period including the start timing of the idle-up control and a predetermined period around start of the idle-up control.

Figure 7:
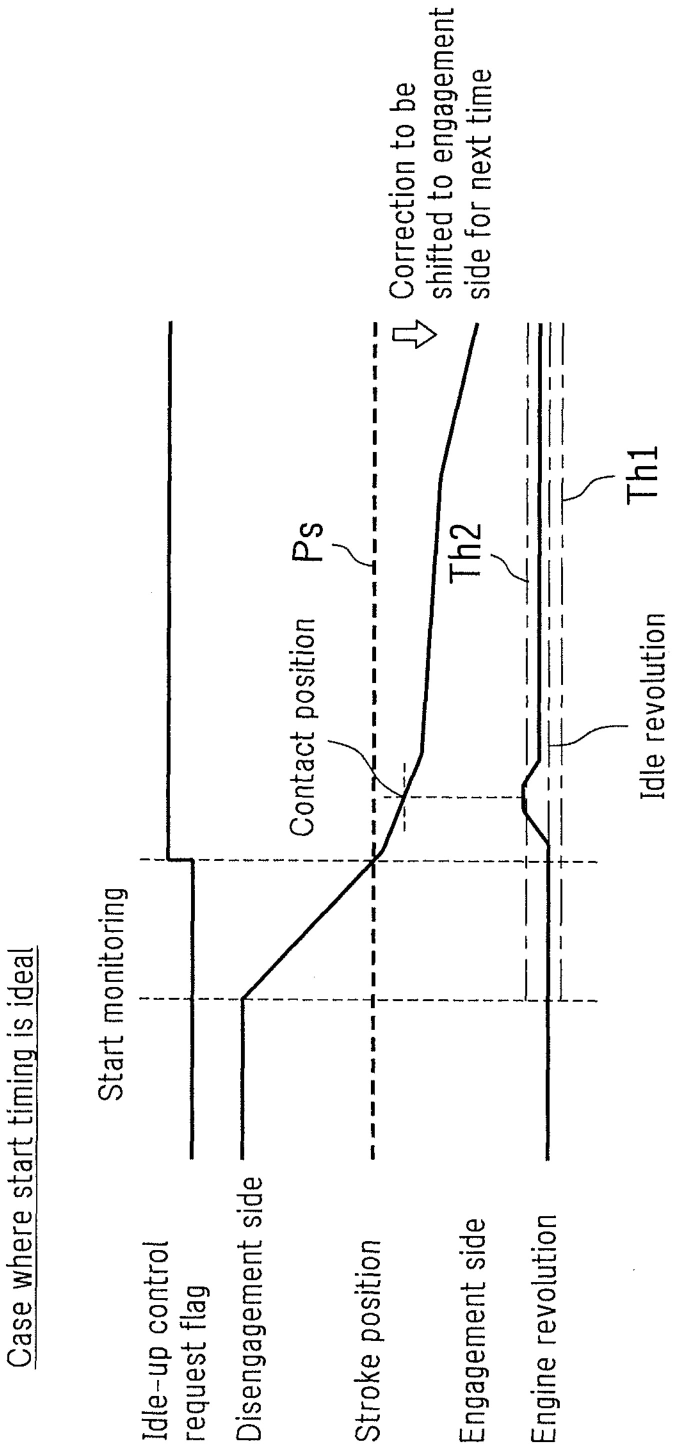
FIG. 7 is a time chart illustrating a case where the start timing of an idle-up control is ideal at the time of starting the vehicle shown in FIG. 1 in an accelerator-off state.
Figure 8:
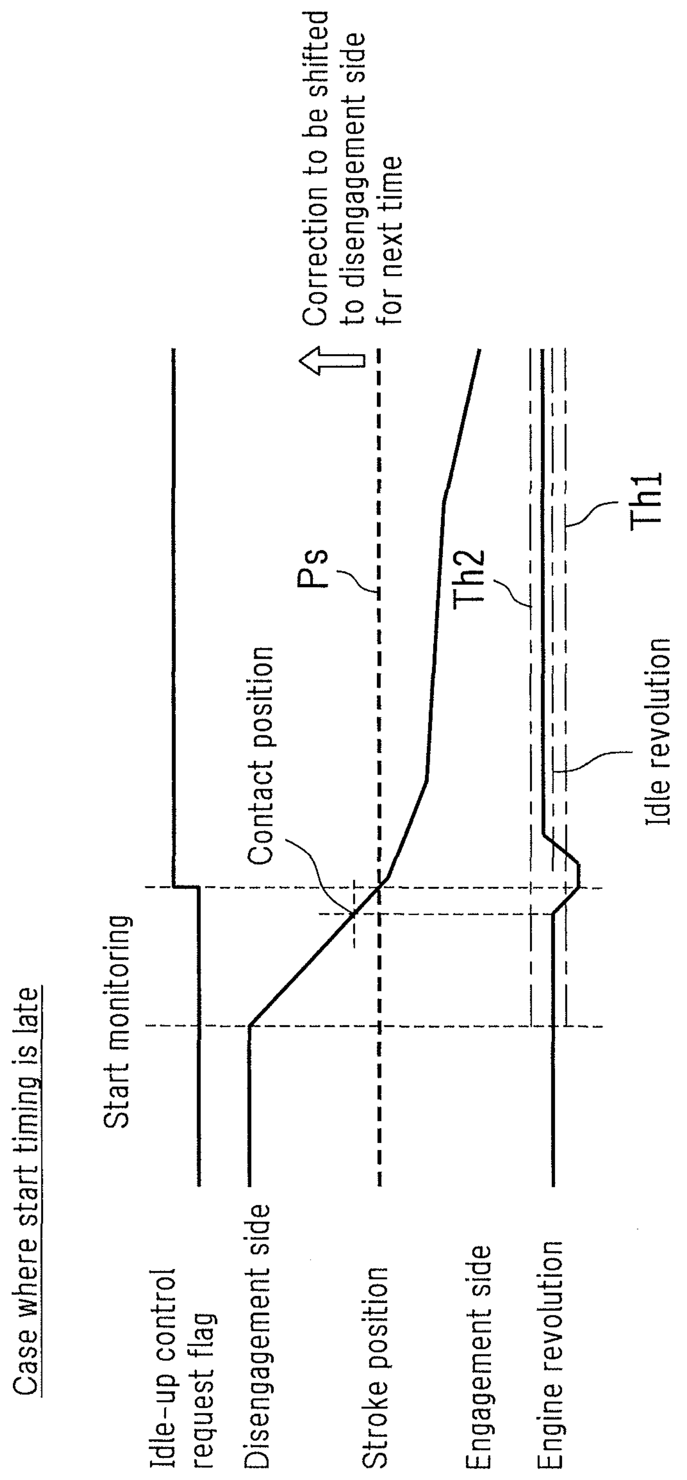
FIG. 8 is a time chart illustrating a case where the start timing of the idle-up control is late at the time of starting the vehicle shown in FIG. 1 in the accelerator-off state.
Figure 9:
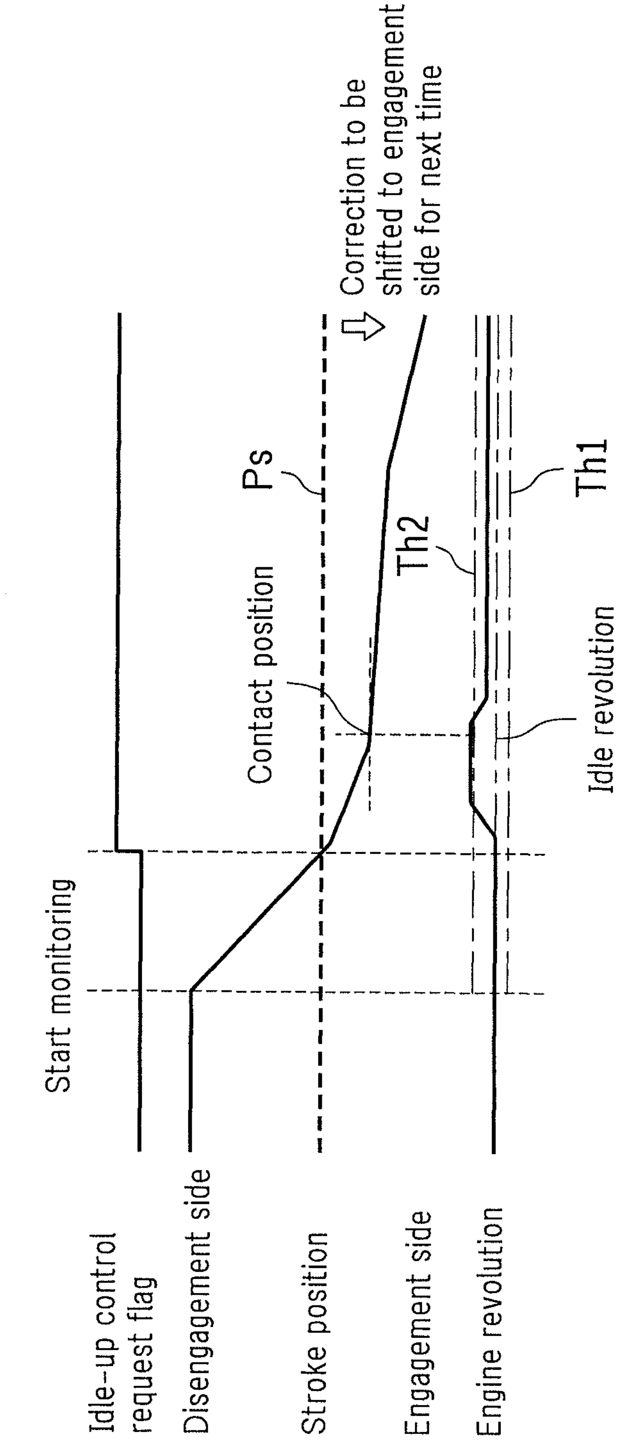
FIG. 9 is a time chart illustrating a case where the start timing of the idle-up control is early at the time of starting the vehicle shown in FIG. 1 in the accelerator-off state.

FIG. 7 to FIG. 9 are each a time chart at the time starting the vehicle in the accelerator-off state. Specifically, FIG. 7 shows a case where the start timing of the idle-up control is ideal, FIG. 8 shows a case where the start timing of the idle-up control is late, and FIG. 9 shows a case where the start timing of the idle-up control is early. Next, the starting operation in the accelerator-off state will be described with reference to FIG. 7 to FIG. 9. In FIG. 7 to FIG. 9, the lateral direction represents a time axis, and time proceeds from the left side toward the right side. The case where the start timing of the idle-up control is late refers to a case where the start timing is later than that in the case where the start timing of the idle-up control is ideal. Similarly, the case where the start timing of the idle-up control is early refers to a case where the start timing is earlier than that in the case where the start timing of the idle-up control is ideal.

[Case where Start Timing of Idle-Up Control is Ideal (Refer to FIG. 7)]

To begin with, before the starting operation in the accelerator-off state, the clutch pedal 7 is depressed by a driver, and the clutch 30 is in a disengaged state. The engine 1 is driven at an idle revolution (for example, 600 rpm). In this starting operation, the accelerator pedal 6 stays in a not depressed state. Then, as the driver gradually releases the depression of the clutch pedal 7, the clutch 30 moves toward the engagement side. In addition, when the movement of the clutch 30 toward the engagement side is detected, the ECU 8 starts monitoring the engine revolution.

Subsequently, when the stroke position of the clutch 30 passes over the idle-up control starting position Ps, an idle-up control request flag is turned ON. When the idle-up control request flag is turned ON, an idle-up control is started. In this idle-up control, the target value of the engine revolution is set at a revolution (for example, 800 rpm) larger than the idle revolution. In the case where the start timing of the idle-up control is ideal, the idle-up control is started in the state (disengaged state) that the clutch 30 is not in contact.

Then, the idle-up control increases the engine revolution to exceed the second threshold value Th2. Subsequently, in the case where the start timing of the idle-up control is ideal, immediately after the engine revolution reaches the target value, the clutch 30 is in contact. When the clutch 30 turns into a half clutch state, the engine revolution decreases by being drawn toward the rear-wheel 44 and 44 sides. At this time, for example, the engine revolution becomes 650 rpm. Further, the clutch 30 moves to the engagement side to have the transmitting torque increased. With this, the rotation of the engine 1 is transmitted to the rear wheel 44 and 44 sides, whereby the vehicle is started.

Here, in this embodiment, when the engine revolution exceeds the second threshold value Th2 before the idle-up control starts, the start timing of the idle-up control is delayed as compared with that of this time for the next time of starting the vehicle in the accelerator-off state. Specifically, the idle-up control starting position Ps is corrected so as to shift toward the engagement side by a second correction amount C2. Here, the start timing of the idle-up control is corrected in the case where the start timing of the idle-up control is ideal because this ideal case is difficult to distinguish from the case where the start timing of the idle-up control is early based on the engine revolution.

[Case where Start Timing is Late (Refer to FIG. 8)]

Before the starting operation in the accelerator-off state, the clutch pedal 7 is depressed by a driver, and the clutch 30 is in the disengaged state. The engine 1 is driven at an idle revolution (for example, 600 rpm). In this starting operation, the accelerator pedal 6 stays in the not depressed state. Then, when the driver gradually releases the depression of the clutch pedal 7, the clutch 30 moves toward the engagement side. In addition, when the movement of the clutch 30 toward the engagement side is detected, the ECU 8 starts monitoring the engine revolution.

Then, in the case where the start timing of the idle-up control is late, the clutch 30 is in contact before the idle-up control starts. Accordingly, the clutch 30 turns into a half clutch state, and thus the engine revolution decreases below the first threshold value Th1 by being drawn toward the rear-wheel 44 and 44 sides.

Subsequently, when the stroke position of the clutch 30 passes over the idle-up control starting position Ps, an idle-up control request flag is turned ON. When the idle-up control request flag is turned ON, an idle-up control starts. In this idle-up control, the target value of the engine revolution is set at a revolution (for example, 800 rpm) larger than the idle revolution. Here, the engine revolution becomes, for example, 650 rpm by being drawn toward the rear-wheel 44 and 44 sides. Furthermore, the clutch 30 moves toward the engagement side, thereby increasing the torque transmitted by the clutch 30. With this, the rotation of the engine 1 is transmitted to the rear wheel 44 and 44 sides, whereby the vehicle is started. The case where the start timing of the idle-up control is late refers to a case where, as compared with the case where the start timing of the idle-up control is ideal, the contact position is shifted toward the disengagement side relative to the idle-up control start position Ps.

Here, in this embodiment, when the engine revolution decreases below the first threshold value Th1 before the idle-up control starts, the start timing of the idle-up control is set to be earlier than that of this time for next starting of the vehicle in the accelerator-off state. Specifically, the idle-up control starting position Ps is corrected so as to shift toward the disengagement side by a first correction amount C1. Here, the first correction amount C1 is set to be larger than the second correction amount C2.

[Case where Start Timing is Early (Refer to FIG. 9)]

Before the starting operation in the accelerator-off state, the clutch pedal 7 is depressed by a driver, and the clutch 30 is in the disengaged state. The engine 1 is driven at an idle revolution (for example, 600 rpm). In this starting operation, the accelerator pedal 6 stays in the not depressed state. Then, as the driver gradually releases the depression of the clutch pedal 7, the clutch 30 moves toward the engagement side. In addition, when the movement of the clutch 30 toward the engagement side is detected, the ECU 8 starts monitoring the engine revolution.

Subsequently, when the stroke position of the clutch 30 passes over the idle-up control starting position Ps, an idle-up control request flag is turned ON. When the idle-up control request flag is turned ON, the idle-up control starts. In this idle-up control, the target value of the engine revolution is set at a revolution (for example, 800 rpm) larger than the idle revolution. Here, in the case where the start timing of the idle-up control is early, the idle-up control is started in the state (disengaged state) where the clutch 30 is not in contact.

Then, the idle-up control increases the engine revolution to exceed the second threshold value Th2. Subsequently, in the case where the start timing of the idle-up control is early, a state that the engine revolution is at the target value is maintained and then, the clutch 30 is brought into contact. Successively, as the clutch 30 turns into the half clutch state, the engine revolution decreases by being drawn toward the rear-wheel 44 and 44 sides. At this time, for example, the engine revolution becomes 650 rpm. Further, the clutch 30 moves toward the engagement side, thereby increasing the torque transmitted by the clutch 30. With this, the rotation of the engine 1 is transmitted to the rear wheel 44 and 44 sides, whereby the vehicle is started. Here, the case where the start timing of the idle-up control is early means the case where, as compared with the case where the start timing of the idle-up control is ideal, the contact position is shifted toward the engagement side relative to the idle-up control start position Ps.

Here, in this embodiment, when the engine revolution exceeds the second threshold value Th2 before the idle-up control starts, the start timing of the idle-up control is delayed as compared with that of this time for the next starting of the vehicle in the accelerator-off state. Specifically, the idle-up control starting position Ps is corrected so as to shift toward the engagement side by a second correction amount C2.

Figure 10:
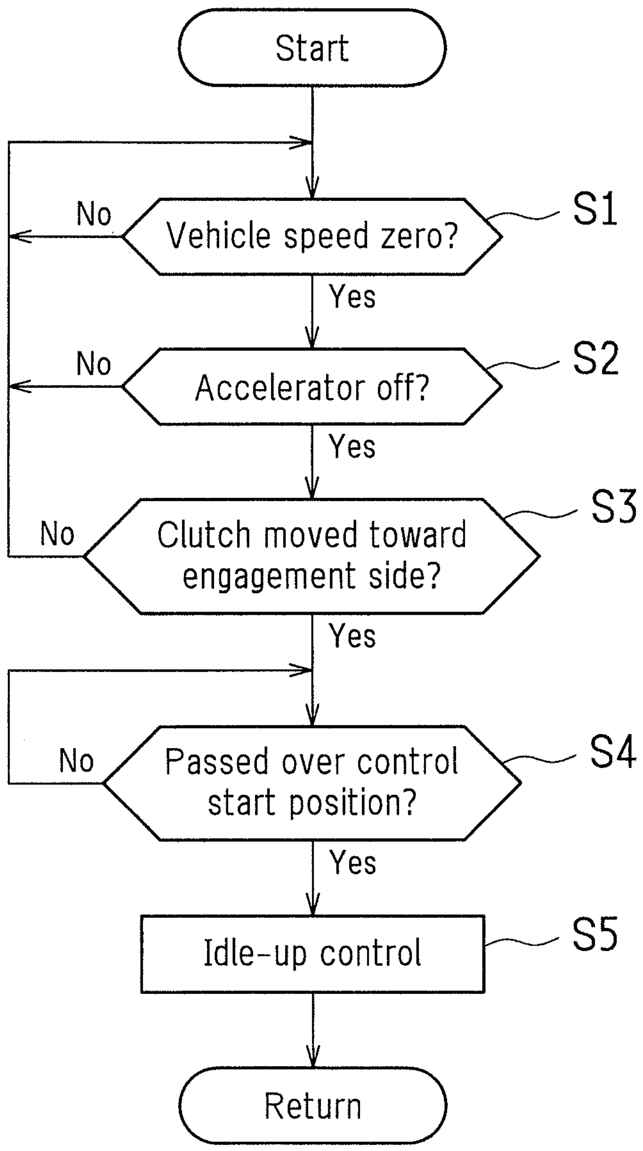
FIG. 10 is a flowchart illustrating an example of idle-up processing performed by the ECU shown in FIG. 6.
Figure 11:
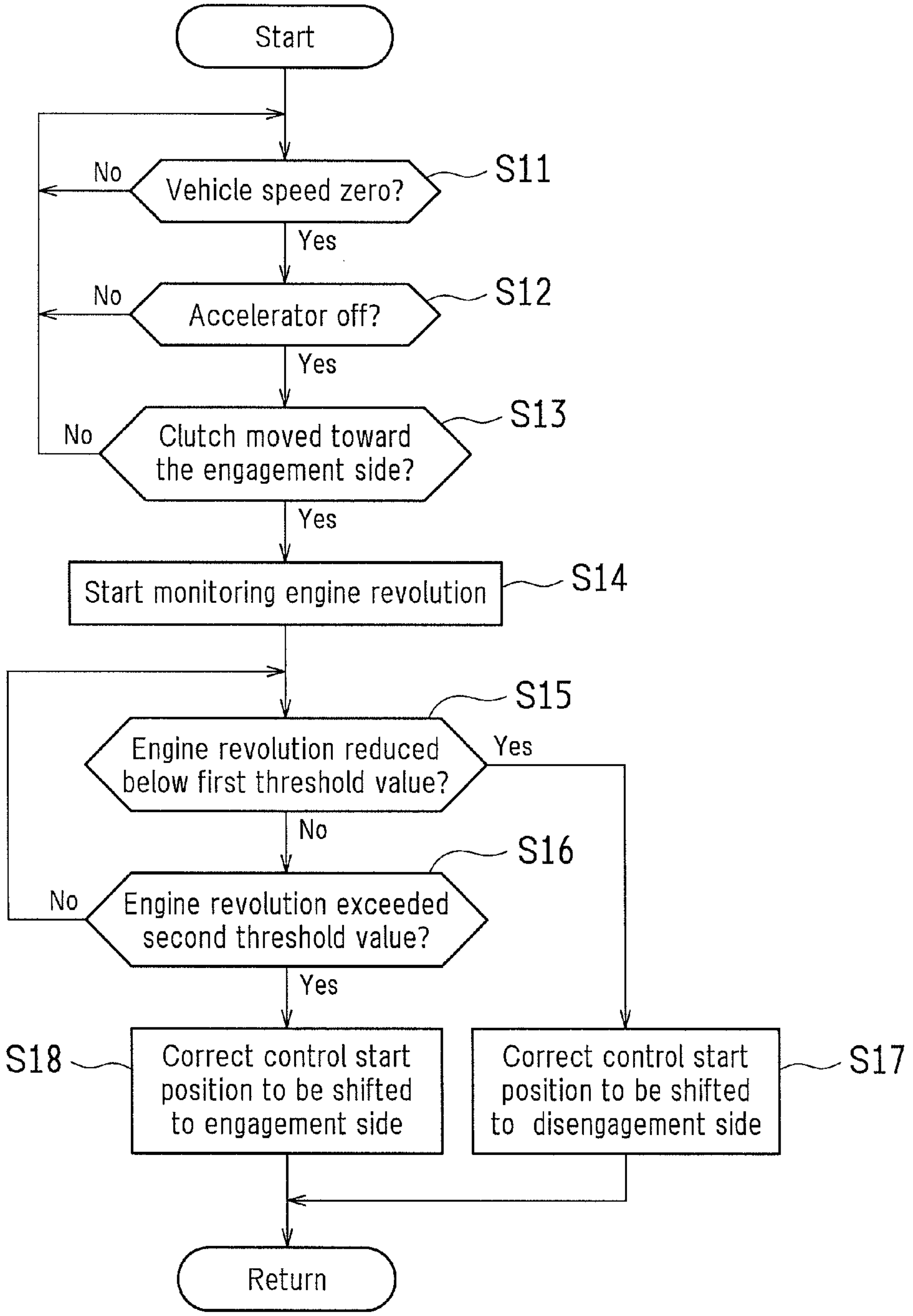
FIG. 11 is a flowchart illustrating an example of correction processing for the start timing of the idle-up control performed by the ECU shown in FIG. 6.

FIG. 10 and FIG. 11 are each a flowchart for describing the processing procedures of the ECU 8 at the time of the starting operation in the accelerator-off state. Next, with reference to FIG. 10 and FIG. 11, description will be given for the processing procedures of the ECU 8 at the time of the starting operation in the accelerator-off state.

At the time the starting the vehicle in the accelerator-off state, the ECU 8 according to this embodiment performs in parallel both idle-up processing including the idle-up control and correction processing for correcting the start timing of the idle-up control. In other words, the start-up operation in the accelerator-off state includes the idle-up processing and the correction processing.

[Idle-Up Processing]

Next, with reference to FIG. 10, the idle-up processing performed by the ECU 8 will be described. A series of following operations are performed repeatedly.

First of all, at Step S1 in FIG. 10, it is determined whether the vehicle speed is zero (the vehicle is not moving). Then, in the case where it is determined that the vehicle speed is zero, the processing proceeds to Step S2. Meanwhile, in the case where it is determined that the vehicle speed is not zero, Step S1 is repeated. Here, whether the vehicle speed is zero is determined based on, for example, a detection result of the wheel speed sensor 431.

Next, at Step S2, it is determined whether the accelerator is off. Then, in the case where it is determined that the accelerator is off, the processing proceeds to Step S3. Meanwhile, in the case where it is determined that the accelerator is not off, the processing returns to Step S1. Here, whether the accelerator is off is determined based on, for example, a detection result of the accelerator opening degree sensor 61, that is, the manipulated amount of the accelerator pedal 6. When the accelerator pedal 6 is not depressed (not manipulated), the processing proceeds to Step S3.

Next, at Step S3, it is determined whether the clutch 30 has moved toward the engagement side. Then, in the case where it is determined that the clutch 30 has moved toward the engagement side, the processing proceeds to Step S4. Meanwhile, in the case where it is determined that the clutch 30 has not moved toward the engagement side, the processing returns to Step S1. Here, whether the clutch 30 has moved toward the engagement side is determined by determining, for example, whether the movement speed of the clutch 30 calculated based on the detection result of the stroke sensor 304*e* has exceeded a predetermined value.

Next, at Step S4, it is determined whether the stroke position of the clutch 30 detected by the stroke sensor 304*e* has passed over the idle-up control starting position Ps. Then, in the case where it is determined that the stroke position has passed over the idle-up control starting position Ps, the processing proceeds to Step S5. Meanwhile, in the case where it is determined that the stroke position has not passed over the idle-up control starting position Ps, Step S4 is repeated. That is, the processing waits until the stroke position passes over the idle-up control starting position Ps.

Next, at Step S5, the idle-up control is performed. For example, when the idle revolution is set at 600 rpm, the target value of the engine revolution is set at 800 rpm. Thereafter, the idle-up control is terminated.

[Correction Processing for Start Timing of Idle-Up Control]

Next, with reference to FIG. 11, description will be given for the correction processing for the start timing of the idle-up control performed by the ECU 8. A series of following operations are repeated. Furthermore, since Steps S11 to S13 respectively correspond to Steps S1 to S3 mentioned above, description for these steps is omitted.

At Step S14 in FIG. 11, monitoring of the engine revolution is started. The engine revolution is calculated based on the detection result of the engine revolution sensor 124.

Next, at Step S15, it is determined whether the engine revolution has decreased below the first threshold value Th1. Then, in the case where it is determined that the engine revolution has decreased below the first threshold value Th1, the processing proceeds to Step S17. Meanwhile, in the case where it is determined that the engine revolution has not decreased below the first threshold value Th1, the processing proceeds to Step S16.

Next, at Step S16, it is determined whether the engine revolution has exceeded the second threshold value Th2. Then, in the case where it is determined that the engine revolution has exceeded the second threshold value Th2, the processing proceeds to Step S18. Meanwhile, in the case where it is determined that the engine revolution has not exceeded the second threshold value Th2, the processing returns to Step S15.

Then, in the case where the engine revolution has decreased below the first threshold value Th1 (Step S15: Yes), it is determined that the start timing of the idle-up control is late. Thus, at Step S17, the idle-up control starting position Ps is corrected so as to shift toward the disengagement side by the first correction amount C1. Thereafter, the correction processing for the start timing of the idle-up control is terminated. This corrected position is used in the next starting of the vehicle in the accelerator-off state. Thus, the start timing of the idle-up control at the next starting of the vehicle in the accelerator-off state can be advanced.

Meanwhile, in the case where the engine revolution has exceeded the second threshold value Th2 (Step S16: Yes), it is determined that the start timing of the idle-up control is ideal or early. Thus, at Step S18, the idle-up control starting position Ps is corrected so as to shift toward the engagement side by the second correction amount C2. Thereafter, the correction processing for the start timing of the idle-up control is terminated. Here, the second correction amount C2 is set to be smaller than the first correction amount C1. The corrected position is used in the next starting of a vehicle in the accelerator-off state. Thus, the start timing of the idle-up control at the next starting of a vehicle in the accelerator-off state can be delayed.

—Effects—

In this embodiment, as mentioned above, when the start timing of the idle-up control is late, by advancing the start timing of the idle-up control at the next time, the start timing of the idle-up control at the time of starting the vehicle in the accelerator-off state can be prevented from being too late. With this, the engine revolution can be prevented from excessively decreasing, and thus the engine revolution can be appropriately increased at the time of starting the vehicle in the accelerator-off state.

Furthermore, in this embodiment, when the start timing of the idle-up control is ideal or early, by delaying the start timing of the idle-up control for the next time, the start timing of the idle-up control at the time of starting a vehicle in the accelerator-off state can be prevented from being too early. With this, the engine revolution can be prevented from excessively increasing, and the engine revolution can be appropriately increased at the time of start of running on the condition of accelerator-off.

Therefore, in this embodiment, even in the case where the contact position of the clutch 30 fluctuates due to production tolerance (individual tolerance), or even in the case where the contact position of the clutch 30 changes over time, the engine revolution can be appropriately increased by correcting the start timing of the idle-up control. Accordingly, the vehicle in the accelerator-off state can be started smoothly. Further, even though manipulation manners for the clutch pedal 7 differ among drives, the start timing of the idle-up control can be corrected in accordance with the manipulation manner of each driver. That is, in this embodiment, even in a vehicle including the clutch pedal 7, the contact position (touch point) of a clutch 30 can be corrected (studied) appropriately.

Figure 12:
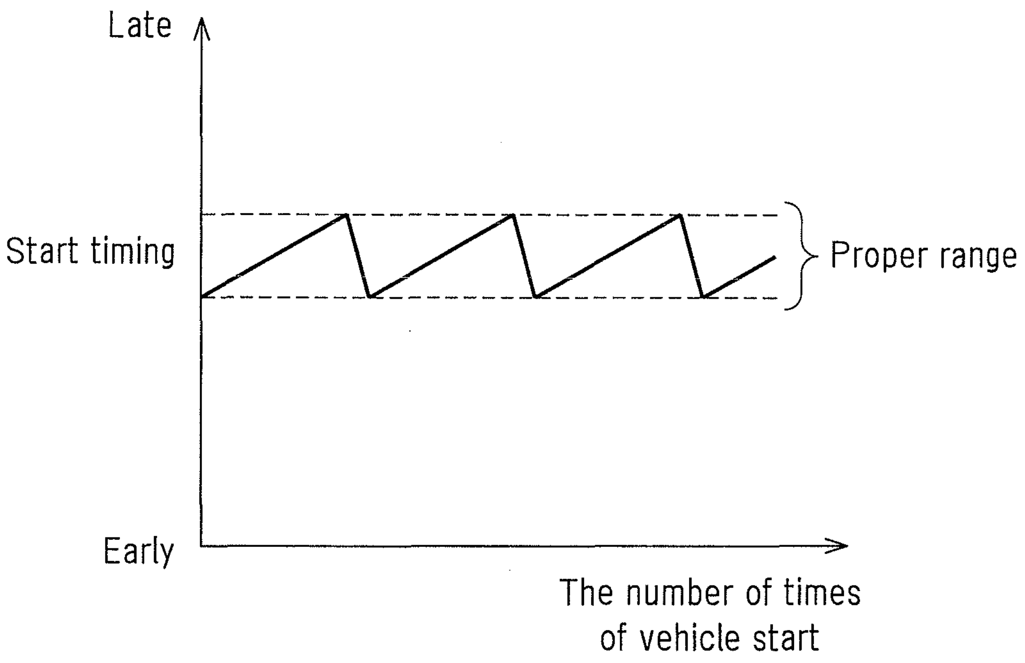
FIG. 12 is a graph illustrating the relationship between the number of times of starting in the accelerator-off state and the start timing of the idle-up control.

Further, in this embodiment, since the start timing of an idle-up control is determined based on change of an engine revolution, it may be difficult to determine whether the start timing is early or ideal. Thus, as shown in FIG. 12, the second correction amount C2 is set to be smaller than the first correction amount C1 so that the start timing can be set within a proper range.

Other Embodiments

The embodiment disclosed herein is exemplarily given in all sorts of points, and does not serve as grounds of restrictive interpretation. Therefore, the technical scope of the present invention should not be interpreted based on only the above-mentioned embodiment, but is determined based on the descriptions in the scope of claims. Furthermore, the technical scope of the present invention includes the equivalents and all sorts of changes within the scope of claims.

For example, this embodiment shows one example in which the present invention is applied to the ECU 8 of a vehicle of a FR type. This, however, should not be construed in a limiting sense. The present invention may be applied to the control device of vehicles of a 4WD type or a FF type.

Figure 13:
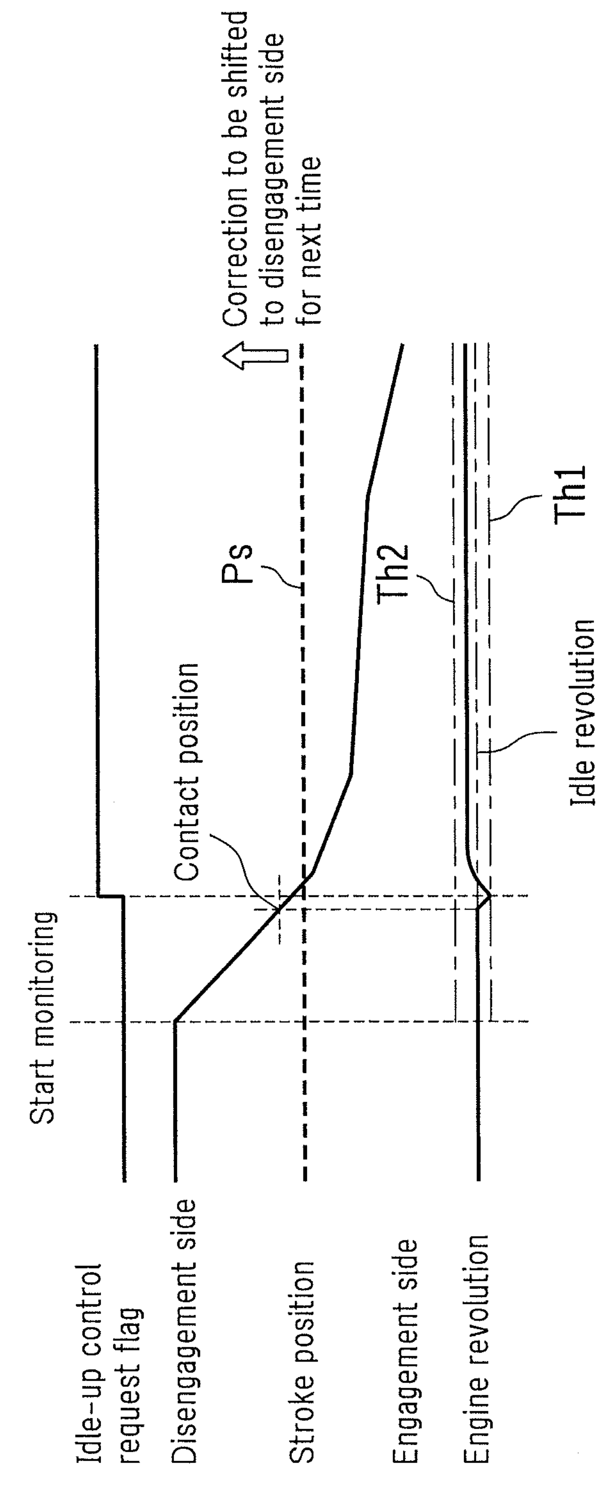
FIG. 13 is a time chart illustrating a case where the start timing of the idle-up control is late at the time of starting a vehicle according to a modification in the accelerator-off state.

Furthermore, as in a modification shown in FIG. 13, when an engine revolution decreases to the first threshold value Th1 (when an engine revolution reaches the first threshold value Th1), an idle-up control may be started immediately without waiting for the stroke position of a clutch 30 to pass over the idle-up control starting position Ps. This configuration may prevent an engine revolution from excessively decreasing. Furthermore, a threshold value for determining whether an idle-up control is to be started immediately may be different from a threshold value for determining whether the start timing of the idle-up control is to be advanced for the next starting of the vehicle in the accelerator-off state.

Moreover, in this embodiment, the start-up operation in the accelerator-off state may be performed only in the case where the first speed stage is established in the manual transmission 2.

In addition, this embodiment shows an example in which when the engine revolution exceeds the second threshold value Th2, the start timing of the idle-up control is delayed for the next starting of the vehicle in the accelerator-off state. This, however, should not be construed in a limiting sense. The start timing of the idle-up control may not be changed (maintained) for the next starting of the vehicle in the accelerator-off state even when the engine revolution exceeds the second threshold value Th2.

Also, this embodiment shows an example in which when the engine revolution decreases below the first threshold value Th1, the start timing of the idle-up control is advanced for the next starting of the vehicle in the accelerator-off state, and when the engine revolution exceeds the second threshold value Th2, the start timing of the idle-up control is delayed for the next starting of the vehicle in the accelerator-off state. This, however, should not be construed in a limiting sense. The start timing of the idle-up control may be advanced for the next starting of the vehicle in the accelerator-off state when the engine revolution is largely decreasing, and the start timing of the idle-up control may be delayed for the next starting of the vehicle in the accelerator-off state when the engine revolution is not decreasing largely (or increasing). That is, the case where the engine revolution is largely decreasing includes the case where the engine revolution decreases below the first threshold value Th1, and the case where the engine revolution is not largely decreasing includes the case where the engine revolution exceeds the second threshold value Th2. The case where the engine revolution is largely decreasing also includes a case where the decreasing rate (changing rate) of the engine revolution decreases below a predetermined threshold value (if the decreasing rate is represented with an absolute value, a case where the decreasing rate exceeds a predetermined threshold value), and the case where the engine revolution is not largely decreasing includes a case where the increasing rate (changing rate) of the engine revolution exceeds a predetermined threshold value.

Furthermore, in this embodiment, the idle-up control request flag and the idle-up control starting position Ps may be stored in the backup RAM 84 of the ECU 8, and the first threshold value Th1, the second threshold value Th2, the first correction amount C1, and the second correction amount C2 may be stored in the ROM 82 of the ECU 8.

Furthermore, this embodiment shows an example in which at Steps S1 and S11, it is determined whether the speed of a vehicle is zero. This, however, should not be construed in a limiting sense. It may be determined whether the speed of a vehicle is substantially zero.

Also, this embodiment shows an example in which the start timing of the idle-up control is determined to be late when the engine revolution decreases below the first threshold value Th1. This, however, should not be construed in a limiting sense. The start timing of the idle-up control may be determined to be late when an ISC (Idle Speed Control) feedback control is activated. That is, the case where the engine revolution is largely decreasing includes a case where the ISC feedback control is activated. Whether the ISC feedback control is activated can be determined based on, for example, an amount of fuel injection of the injector 102, the ignition timing of the ignition plug 103, the amount of actuation of the throttle motor 106 of the throttle valve 105, and the like.

DESCRIPTION OF THE REFERENCE NUMERAL

1 Engine
2 Manual transmission
7 Clutch pedal (clutch manipulation unit)
8 ECU (control device for vehicle)
30 Clutch mechanism (clutch)

The invention claimed is:

1. A control device for a vehicle comprising:
- an engine;
- a manual transmission;
- a clutch disposed between the engine and the manual transmission; and
- a clutch manipulation unit with which a driver controls a state of the clutch,
- wherein an engine revolution increasing control to increase an engine revolution is started at a predetermined start timing when the clutch is switched from a disengaged state to an engaged state by manipulation of the clutch manipulation unit at the time of starting the vehicle in an accelerator-off state, and
- wherein in a case where the engine revolution is decreased below a first threshold value smaller than an idle revolution in a predetermined period around start of the engine revolution increasing control, the start timing of the engine revolution increasing control is advanced for a next starting of the vehicle in the accelerator-off state.

2. The control device for a vehicle according to claim 1, wherein in a case where the engine revolution exceeds a second threshold value larger than the idle revolution in the predetermined period around the start of the engine revolution increasing control, the start timing of the engine revolution increasing control is delayed for the next starting of the vehicle in the accelerator-off state.

3. The control device for a vehicle according to claim 2, wherein a first correction amount to advance the start timing of the engine revolution increasing control is larger than a second correction amount to delay the start timing of the engine revolution increasing control.

4. The control device for a vehicle according to claim 1, wherein in a case where the engine revolution is decreased below the first threshold value smaller than the idle revolution before start of the engine revolution increasing control, the engine revolution increasing control is started.

5. The control device for a vehicle according to claim 1, wherein the start timing of the engine revolution increasing control is determined based on a stroke position of the clutch.

* * * * *